United States Patent [19]

Cottone et al.

[11] Patent Number: 5,549,927
[45] Date of Patent: Aug. 27, 1996

[54] MODIFIED SUBSTRATE SURFACE AND METHOD

[75] Inventors: Andrew J. Cottone, Racine, Wis.; Zalman P. Saperstein, Lake Bluff, Ill.; Ronald D. Tait, Franksville, Wis.; Richard G. Parkhill; Jeffrey A. Bahr, both of Racine, Wis.

[73] Assignee: Modine Manufacturing Company, Racine, Wis.

[21] Appl. No.: 203,787

[22] Filed: Mar. 1, 1994

[51] Int. Cl.⁶ .................................. B05D 3/02; B05D 1/34
[52] U.S. Cl. .......................... 427/191; 427/192; 427/201; 427/374.4
[58] Field of Search .................................. 427/190, 191, 427/192, 201, 204, 205, 262, 282, 374.4, 189

[56] References Cited

U.S. PATENT DOCUMENTS

| | | | |
|---|---|---|---|
| 2,981,648 | 4/1961 | Peterson et al. | 148/23 |
| 2,987,816 | 6/1961 | Noland et al. | 29/493 |
| 3,373,483 | 3/1968 | Miller | 29/501 |
| 3,461,462 | 8/1969 | Ruggiero | 29/492 |
| 3,951,328 | 4/1976 | Wallace et al. | 228/207 |
| 3,971,501 | 7/1976 | Cooke | 228/248 |
| 4,235,649 | 11/1980 | Inamura et al. | 148/24 |
| 4,273,593 | 6/1981 | Mastrangelo | 148/24 |
| 4,475,960 | 10/1984 | Yamawaki et al. | 148/26 |
| 4,504,007 | 3/1985 | Anderson et al. | 228/123 |
| 4,558,695 | 12/1985 | Kumazawa et al. | 228/183 |
| 4,619,716 | 10/1986 | Suzuki et al. | 148/26 |
| 4,643,740 | 2/1987 | Nicolson et al. | 51/293 |
| 4,749,594 | 6/1988 | Malikowski et al. | 427/190 |
| 4,842,185 | 6/1989 | Kudo et al. | 228/183 |
| 4,861,681 | 8/1989 | Asano et al. | 428/654 |
| 4,888,067 | 12/1989 | Sato et al. | 148/26 |
| 4,901,908 | 2/1990 | Negura et al. | 228/183 |
| 4,901,909 | 2/1990 | George | 228/223 |
| 4,906,307 | 3/1990 | Fujiyoshi | 148/26 |
| 4,928,872 | 5/1990 | Rabinkin | 228/203 |
| 4,962,880 | 10/1990 | Iwai et al. | 228/183 |
| 4,981,526 | 1/1991 | Kudo et al. | 148/75 |
| 4,989,776 | 2/1991 | Hepburn | 228/118 |
| 5,042,574 | 8/1991 | Cottone et al. | 165/133 |
| 5,100,048 | 3/1992 | Timsit | 229/198 |
| 5,102,032 | 4/1992 | Cottone et al. | 228/183 |
| 5,175,018 | 12/1992 | Lee et al. | 427/8 |
| 5,181,558 | 1/1993 | Tsuda et al. | 165/133 |
| 5,190,596 | 3/1993 | Timsit | 148/23 |
| 5,232,788 | 8/1993 | Timsit et al. | 428/560 |
| 5,251,374 | 10/1993 | Halstead et al. | 29/890 |
| 5,271,954 | 12/1993 | Mastanduno | 427/8 |

*Primary Examiner*—Michael Lusignan
*Assistant Examiner*—Fred J. Parker
*Attorney, Agent, or Firm*—Wood, Phillips, VanSanten, Clark & Mortimer

[57] ABSTRACT

Potential difficulties in surface modification of a substrate are avoided by using a mixture that includes a ceramic powder, a brazing material and a flux. Exposure to an elevated temperature activates the flux and at least partially melts the brazing material. Upon cooling, the melt solidifies to bond the ceramic powder to the substrate surface an create the modification.

39 Claims, 1 Drawing Sheet

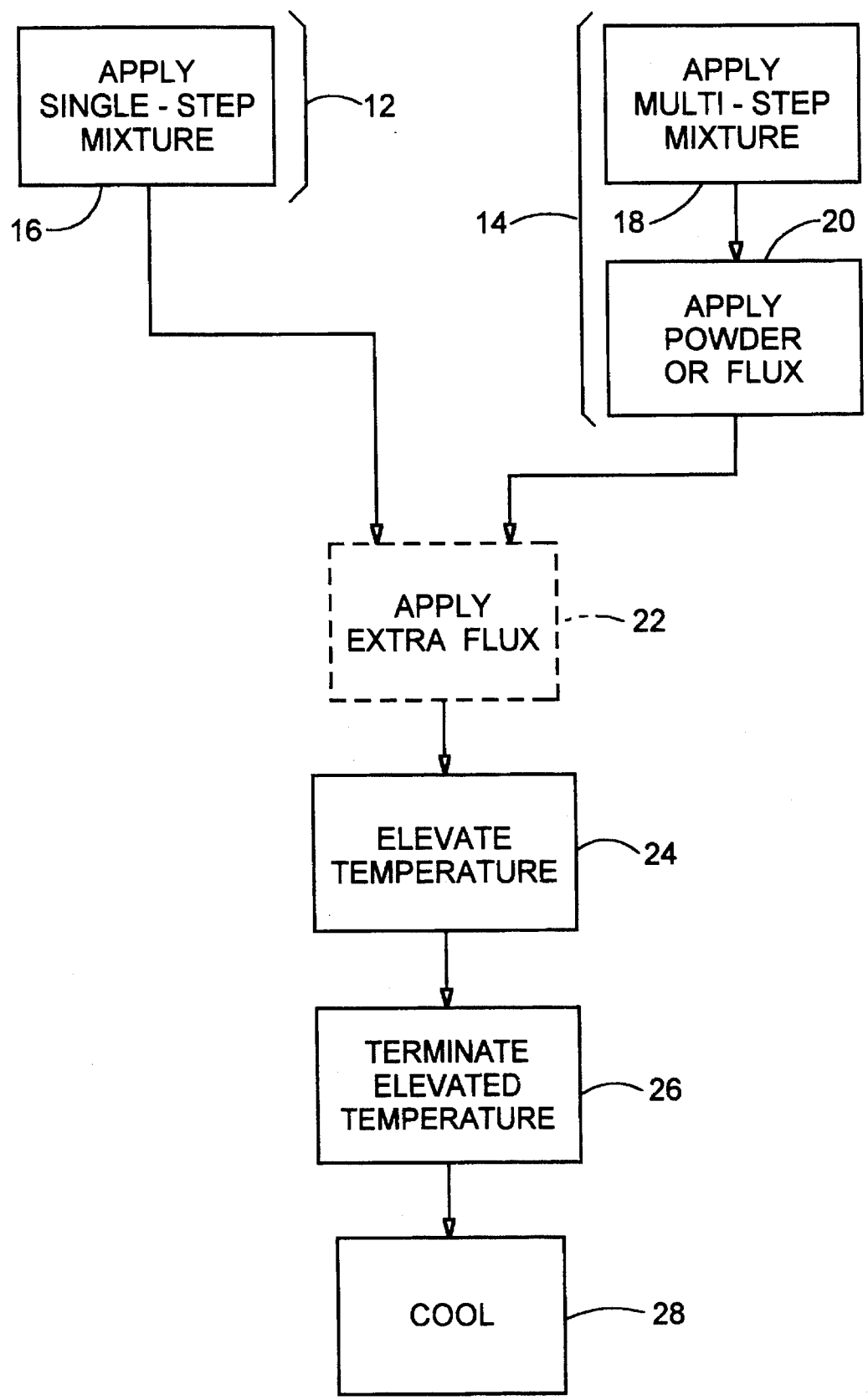

MODIFIED SUBSTRATE SURFACE AND METHOD

FIELD OF THE INVENTION

This invention generally relates to surface modification of a substrate surface using a mixture including a ceramic powder, a metal brazing material and a flux, and, more particularly, to a topological modification bonded to the substrate surface that exhibits altered or improved physical or chemical properties. The invention also relates to a method of using the mixture for modifying the substrate surface. The modified surface can be used in numerous applications including heat transfer devices.

BACKGROUND OF THE INVENTION

Surfaces of metal and ceramic substrates have been modified in a variety of ways to improve and alter their characteristics. Unfortunately, various shortcomings have been experienced, depending upon the modifying treatment employed.

For example, surfaces have been modified using a plasma/flame process that shoots hot metal particles towards a surface. Upon impact, the particles are mechanically bonded to the surface. This process is performed in the open air which results in oxidation of the metal particles. Oxidation is undesirable because it prevents metallurgical bonding.

Surfaces have also been modified using mechanical processes such as abrasion, shot peening and scribing. Typically, these mechanical processes result in modification on a macroscopic scale and therefore have little effect on a microscopic scale. Furthermore, scribing cannot be done on a ceramic substrate and provides only a limited number of modification patterns.

Chemical etching and milling modify the surface by adding or removing molecules. The chemicals utilized frequently are harmful to the environment and therefore their use is undesirable.

Surfaces have been modified by placing a polymer layer on a surface and then embedding particles in or on the polymer layer. A typical problem encountered with this process is the encasement of particles by the polymer which reduces the effectiveness of the particles and the surface modification. Also, the polymer may delaminate thus removing the surface modification.

Another method for coating surfaces with hard substances requires heating a powder on the surface to be modified to 900° to 1200° C. See, for example, U.S. Pat. No. 4,749,594 to Malikowski et. al. Many surfaces cannot withstand these extremely high temperatures without undergoing deformation, degradation or other undesirable change.

Apart from the matter of surface modification as mentioned above, in a typical prior art brazing operation a flux is used to clean (deoxidize) and protect the metal surfaces to be joined and to promote flow of a brazing alloy. For aluminum alloys, the brazing temperature is typically in the range of about 570° to about 610° C., i.e., about 1,050° to about 1,130° F., depending on the flux and brazing alloy used. The relatively high brazing temperatures result in a number of drawbacks. Metal alloys having a melting temperature less than 570° C. cannot be used. Substrates that would experience deformation or chemical change when exposed to these temperatures cannot be used. A brazing oven in which the brazing is performed must be set at this high temperature.

Residual flux from the prior art brazing operation must often be removed because it can be corrosive in the presence of water and it can adversely affect paint/glue adhesion (the paint/glue adheres satisfactorily to the flux but the flux adheres poorly to metal). Thus, a step is required to remove the flux. The more flux that is used the higher the cost for the total amount of flux and the more residual flux that must be removed. Conventional removal steps, e.g., washing and thermal cracking, are not only inconvenient, but are often not effective in removing all of the residual flux or flux reaction products..

A paste including a powder brazing alloy and flux can be utilized in place of a braze clad metal to which flux is applied. However, the same problems with respect to residual flux exist. Additionally, the paste can be dislodged in the normal course of handling the surface prior to heating, leaving sections of the surface without the brazing alloy and flux, thereby creating the potential for a poor or nonexistent braze joint.

SUMMARY OF THE INVENTION

It is a principal object of the invention to provide a new and improved modified substrate surface. The modification to the substrate surface is a topographical modification bonded to the substrate surface so that the resulting modified substrate surface exhibits altered or improved physical or chemical properties as compared to the unmodified substrate surface. The topographical modification can be a microscopic topographical modification. It is also an object to provide a method of modifying the substrate surface, a method of using a mixture suitable to modify the substrate surface and a mixture suitable to modify the substrate surface.

The modified substrate surface of the invention, according to one form thereof, incorporates a ceramic powder, a meltable metal powder that bonds to the substrate and which potentially may bond with the ceramic powder as well, and a flux which, when applied to the substrate, heated and solidified, preferably produces a flux reaction product which appears as a glass-like phase which bonds to the substrate and generally will bond to the ceramic and metal powder as well. Aluminum rich metal powders and substrates are preferred.

To produce the modification, the mixture whose components include a ceramic powder, a metal brazing material and a flux is applied to the substrate surface to be modified. The brazing material can be one or more of a braze clad that is part of the surface and a metal brazing powder that is combined with the other components. The mixture is exposed to an elevated temperature for a time period sufficient to activate the flux and at least partially melt the brazing material, i.e., at least partially melt at least one of the cladding or the metal brazing powder. Upon solidification of the melt, the ceramic powder is bonded to the substrate surface. Optionally, a binder can be applied to the substrate surface to inhibit movement of the ceramic and metal brazing powders which permits manipulation of the substrate having the ceramic and metal brazing powders thereon while it is still in the "green" state, i.e., prior to exposure to the elevated temperature. In the green state, the flux in its unreacted state is present. After exposure to the elevated temperature and solidification, the reaction product of the flux, e.g., the glass-like phase, is present.

The brazing material, which can be a nonconventional brazing material, forms a metallurgical bond (braze or solder), or a mechanical bond therewith. Thus, the modification can be achieved by soldering and modification by soldering is meant to be included by the use of the word "brazing" in its various grammatical forms unless soldering is specifically excluded. The brazing material is capable of holding the ceramic powder in place after the brazing material has been melted and then solidified.

The preferred mixture includes as components a silica-containing ceramic powder, an aluminum-containing metal brazing alloy powder as the brazing material, a potassium fluoro aluminate complex as the flux, a polystyrene intermediate as the binder and a vehicle in which the remaining components of the mixture are dispersed.

The physical relationship between the flux and powder(s) due to the use of the binder results in minimization of the amount of flux utilized and hence a cost savings. It is presently theorized that the binder encapsulates the flux and powder(s) together and promotes intimate contact therebetween to more effectively use the flux. The resulting flux reduction also lessens or eliminates the requirement that the residual flux be removed which lessens or eliminates the effort and cost of residual flux removal. However, the binder may not always be desirable for certain brazing atmospheres. It is also presently theorized that the preferred flux is partially involved in the fusion of the ceramic powder to the substrate by causing partial melting of the ceramic powder at low temperatures, i.e., a temperature less than the melting temperature of the ceramic powder. The preferred molten flux is also theorized to participate in a liquid-solid reaction creating a fused glass-like phase that bonds to the metal or ceramic and that can bond metal to metal, metal to ceramic and ceramic to ceramic.

The elevated temperature is preferably sufficient to effect brazing. It is believed that the elevated temperature at which activation and melting occur for a given flux and brazing material is relatively low (as compared to conventional brazing conditions) because of the encapsulation, i.e., encapsulation results in a depression of the activation and melting temperatures. The activation of the flux at the lower temperature, especially below the melting temperature of the flux, enables the use of brazing materials, especially metal brazing powders, having melting temperatures below that of the flux. This reduction in temperature enables the use of metal brazing powders and substrates, e.g., die cast aluminum, that normally cannot be exposed to brazing conditions due to the low melting temperature of the metal. Importantly, the reduced temperature enables the temperature of the furnace in which the modification is performed to be reduced, thus reducing energy costs—especially in electric furnaces.

The substrate can be a metal substrate or a ceramic substrate. The invention permits the use of substrates that cannot be exposed to high temperatures without undergoing deformation, degradation or other undesirable change.

Application of the mixture can be accomplished in either a single step application or a multi-step application by immersion, brushing or spraying. In the multi-step application, the optional binder is applied to the surface and then at least one, but not all, of the powders and/or the flux is sprayed to deform the binder and embed the powder(s) or flux therein.

The mixture can be applied to an area of the substrate surface that is free of a joint with another substrate surface. Alternatively, a joint can be present within the area that is being modified.

The modified substrate surface can exhibit an alteration or improvement in one or more of several desirable physical or chemical properties such as hydrophilicity, hydrophobicity, wear resistance, corrosion resistance, oxidation resistance, paint/glue adhesion, thermal insulation, heat transfer capabilities or increased surface area as compared to the substrate surface.

The substrate having a modified surface can be used in a heat transfer device, e.g., a condenser or an evaporator.

Numerous other advantages and features of the present invention will become readily apparent from the following detailed description of the preferred embodiments and the appended claims.

BRIEF DESCRIPTION OF THE DRAWING

The FIGURE is a flow diagram schematically illustrating the steps of modifying the surface.

DETAILED DESCRIPTION OF THE PREFERRED EMBODIMENTS

Although this invention is susceptible to embodiment in many different forms, there are shown in the drawing and will be described in detail, presently preferred embodiments of the invention. It should be understood, however, that the present disclosure is to be considered as an exemplification of the principles of this invention and is not intended to limit the invention to the embodiments illustrated.

Topological modification of a substrate surface by a ceramic powder produces a modified substrate surface that exhibits altered or improved physical or chemical properties as compared to the unmodified substrate surface. These physical and chemical properties include hydrophilicity, hydrophobicity, corrosion resistance, wear resistance, paint/glue adhesion, thermal insulation, heat transfer capability and increased surface area.

The term "topological modification," as used herein, identifies a change in the original surface to the substrate. Representative changes include the addition of microscopic features, e.g., bumps, fins, irregularities and the like, to the substrate surface and alteration of the chemical composition of the substrate surface.

This invention is applicable to various substrate surfaces and can be used in a number of applications including, but not limited to, heat exchangers such as evaporators and condensers used for air conditioners and refrigerators. For example, the efficiency of an evaporator can be enhanced by using a hydrophilic modified substrate surface. Exposure of this modified surface to a humid air stream whose water vapor condenses on the evaporator surfaces results in improved wetting and draining of the modified surface and hence improved removal of the water, thereby increasing the efficiency of the evaporator. The efficiency of a refrigerant condenser can be enhanced by using a modified surface having an increased surface area. As heat transfer is increased as surface area increases, exposure of this surface to the ambient air increases the rate at which the refrigerant is condensed within the condenser.

The topological modification is achieved using a mixture that includes as components a ceramic powder, a brazing material and a flux. The brazing material can be a braze clad that is part of the surface or a metal brazing powder. The mixture can optionally include a metal powder that is not a conventional brazing powder (hereinafter referred to as "metal powder"), a binder and a vehicle. In the method of modifying the substrate surface, the mixture is applied to the substrate surface and heated to an elevated temperature to activate the flux and at least partially melt at least one of the cladding or the metal brazing powder. In the method of using the mixture to modify a substrate surface, the mixture is applied to the substrate, surface and the surface is modified using the mixture.

The term "activate the flux," as used herein, means that the temperature of the flux is increased so that, depending on the type of flux, it will either reduce or dissolve the oxides on the surface to be modified, the metal brazing powder, the metal powder or the ceramic powder.

The FIGURE is a flow diagram for the modification of a surface of a substrate. The flow diagram shows a one-step application process as a first alternative 12 and a multi-step application process as a second alternative 14 to effect modification. In the first alternative 12, a single step application mixture including the ceramic powder, metal brazing powder (which is optional if the surface is braze clad) and flux and the optional metal powder, binder and vehicle is applied to the substrate surface as noted in box 16 to deposit the mixture on the substrate surface. In the second alternative 14, a multi-step application mixture including the binder, vehicle and at least one but not all of the ceramic powder, metal brazing powder (which is optional if the surface is braze clad), metal powder or flux is applied in a first step to the substrate surface (box 18). The ceramic powder, metal brazing powder, metal powder and/or flux not applied in the first step is then applied in a second step (box 20). The second step is preferably performed by a conventional spraying technique, to deform the binder and embed and encapsulate at least a portion of the sprayed powder(s) and flux in the binder.

Optionally, additional flux in the form of an aqueous flux mixture can be applied to the mixture previously deposited on the substrate surface (box 22).

The substrate surface having the applied mixture, whether produced by the first alternative 12 or second alternative 14, is then subjected to an elevated temperature (box 24), the temperature being effective to remove the binder, activate the flux and at least partially melt the braze cladding or the metal brazing powder. After a time period sufficient to cause removal, activation and melting, the exposure of the substrate surface to the elevated temperature is terminated (box 26). The surface is permitted to cool (box 28) to solidify the melt which results in the ceramic powder being bonded to the surface. Preferably, the ceramic powder is not fully encased in the solidified melt and part of the ceramic powder protrudes from the solidified melt.

The powder particle size, for all of the powders, should not be too small or it will greatly increase the surface area of any given mass of the powders and require an increase in the amount of flux utilized. Preferably, the particle size of the powder(s) is about 1 to 1,000 microns. Preferably, the powder(s) is insoluble in the vehicle and will not chemically react with the other components of the mixture or the substrate at least until heating.

In order to use the ceramic powder, the substrate surface to which the ceramic powder is applied must have metal thereon that is capable of becoming partially molten at an elevated temperature, e.g., the braze cladding or metal brazing powder. The ceramic powder is suspended in the molten metal which then bonds the ceramic to the substrate surface upon solidification. The bonding can be accomplished by brazing the ceramic powder to the substrate surface. The flux is presently theorized to assist in fusing the ceramic powder to the substrate. That is, upon activation the flux flows and can partially encase some or all of the ceramic powder particles. Upon solidification, the flux reaction product (which is a glass-like phase) binds the ceramic powder particles to the substrate. Because the ceramic powder is only partially encased, a portion of each ceramic powder particle extends from the reaction product. In a like manner, metal powder can also be bonded to the substrate surface.

Representative ceramic powders include silicon carbide, aluminum oxide, silica, silicon nitride, silica alumina and the like. Preferred ceramic powders include those containing silica. A preferred ceramic powder is a ceramic microsphere. Representative microspheres are zeeospheres types 600 and 800 which are made of silica alumina and which are both commercially available from Zeelend Industries, St. Paul, Minn.

The brazing material does not necessarily form a metallurgical bond with the substrate surface but rather can form a mechanical bond. Thus, the brazing material can be equivalent of a soldering alloy and modification by soldering is included in the term brazing in its various grammatical forms unless specifically excluded.

The metal powder and metal brazing powder can be in elemental form or an alloy, e.g., a brazing alloy. Unconventional metal brazing powders and metal powders that are normally avoided, for example, under brazing conditions, due to their low melting temperature can be utilized because of the encapsulation. Encapsulation is promoted by the use of a binder. The metal brazing powder can have a melting temperature less than the melting temperature of the flux. Preferably, the metal brazing powder has a liquidus at a temperature in the range of about 530° to about 610° C. The use of a flux with this type of metal brazing powder is unique. The temperature at which a conventional brazing powder melts is also depressed by encapsulation. The melting temperature depression results in a savings of energy costs to heat a brazing oven.

Zinc is a representative metal brazing powder or metal powder in elemental form.

Representative alloys for use as the metal brazing powder or the metal powder include an aluminum and silicon alloy powder, an aluminum and zinc alloy powder, an aluminum, silicon and zinc alloy powder and steel. Corrosion resistance can be improved by using a sacrificial metal brazing powder or metal powder, i.e., a metal that oxidizes before the base metal of the substrate. For example, zinc powder (which is in its elemental form) can be used as a sacrificial material with an aluminum-containing substrate. The zinc will oxidize prior to the aluminum, thus protecting the aluminum.

Representative meted brazing powders and metal powders include: AA 718 alloy which has a composition of 88 wt. % aluminum and 12 wt. % silicon; an alloy containing 55 wt. % zinc and 45 wt. % aluminum; and AA 719 alloy, commercially available from Alcoa, which has a composition of 76 wt. % aluminum, 10 wt. % silicon, 10 wt. % zinc and 4 wt. % copper.

Alternatively, the brazing material can be a braze cladding having the composition of one of the above-described metal brazing powders.

Preferably, the flux is insoluble in the vehicle or the binder and will not participate in a chemical reaction with the other components of the mixture or the substrate prior to heating. Also, the residue of the flux after the heating step is preferably a noncorrosive flux reaction product and need not be removed. The flux is conventionally selected based upon the substrate surface. Oxides on the substrate surface, the ceramic powder, the metal brazing powder and metal powder are removed, dissolved and/or fused by the flux to facilitate flow of the molten substrate surface, the metal brazing powder or metal powder. In most cases, the flux reaction product may enhance the bond of the ceramic powder to the substrate.

Representative fluxes are disclosed in U.S. Pat. No. 5,190,596 to Timsit, U.S. Pat. No. 3,951,328 to Wallace et at., and U.S. Pat. No. 3,971,501 to Cooke, each of which is incorporated herein by reference in its entirety. The flux is preferably a potassium fluoro aluminate complex such as Alday Braze 2805 flux or Nocolok 100 flux, both of which are commercially available.

Optionally, a binder is applied to the substrate surface. The binder is presently theorized to encapsulate the powders and flux together to achieve intimate contact therebetween which results in a more effective use of the flux to reduce the amount of flux present in the composition as compared to conventional flux-containing systems, e.g., brazing systems. Encapsulation is theorized to depress the activation temperature of the flux and the melting temperature of the brazing material. The binder should be sprayable because spraying is a preferred method of applying the mixture. The binder should not form strings when exiting the sprayer. To enable handling, the binder should be tack free shortly after application to the substrate surface. Desirably, the mixture-coated surface can be handled while still in the "green" state, i.e., before it is subjected it to the elevated temperature. That is the binder is preferably selected so as to not be dislodged under anticipated handling conditions, and therefore, the ceramic powder, metal brazing powder, metal powder and flux are still in place after handling in the green state to effect surface modification. The temperature at which removal of the binder occurs can be slightly less than the temperature at which the flux is activated and at which the braze cladding or the metal brazing powder at least partially melt. Upon heating, the binder must be removed, as by vaporization or decomposition, without leaving a residue that can adversely affect the modification directly or by creating an undesirable reaction product in the brazing atmosphere.

Representative binders having the above described characteristics include methyl methacrylate, isobutylene and a polystyrene intermediate T-738 commercially available from Huntsman. The polystyrene intermediate, the presently preferred binder, has a weight average molecular weight of 180,000 and a number average molecular weight of 70,000. This polystyrene intermediate is capable of being sprayed without the production of strings between the sprayer and the substrate surface. At the desired elevated temperature, the polystyrene intermediate degrades and is substantially free of ash and residual carbon that can adversely affect physical properties such as corrosion resistance, tensile strength and the like and thus is readily removed simply by temperature induced degradation.

The mixture generally, but not always, includes a vehicle that is selected depending upon the binder utilized and the method of application. To obtain a desired uniform coating, the viscosity of the mixture can be adjusted by the selection of the vehicle and the amount used. The viscosity can be increased to enable application of the mixture by immersion or reduced to enable application by spraying. Preferably, any non-aqueous vehicle utilized is miscible in water to permit water to be a major component of the vehicle-containing mixture. Representative vehicles include inorganic solvents, organic solvents, polyols and the like, e.g., wager, chlorinated solvents such as perchloroethylene and trichloroethane, dipropylene glycol and high molecular weight polyethylene oxide. When water is used, a co-solvent such as an alcohol or water soluble acetate can also be utilized. In many cases, water alone may serve as the vehicle.

A thickener can be utilized to make the mixture thixotropic and is highly desirable for spray application. The viscosity of the thixotropic mixture is reduced by the shear forces encountered during spraying to facilitate applying the mixture. When the thixotropic mixture is deposited onto the substrate surface, the shear forces no longer exist and the viscosity increases to minimize dripping and running of the mixture so a uniform coating is obtained. Representative thickeners include hydroxy propyl cellulose and cellulose acetate.

An antioxidant can be utilized so that water present in the mixture does not react with metal present in the mixture or at the substrate surface. A representative antioxidant is benzotriozol.

The mixture can include the ceramic powder in an amount in the range of about 5 to about 75 weight percent (wt. %), the metal brazing powder and metal powder in an amount in the range of 0 to about 75 wt. % and the flux in an about in the range of about 25 to about 40 wt. %, the wt. %s being based on the weight of the ceramic powder, metal brazing powder, metal powder and flux. The metal brazing powder is optional, i.e., as low as 0 wt. %, when the substrate surface is a braze clad substrate surface. The weight ratio of the ceramic powder, metal material and metal powders to flux preferably should be no more than about 8:1 because if less than about 8 wt. % of flux, based on the total weight of the flux, brazing material and metal powder, is utilized, the mount of flux may be ineffective to reduce/dissolve oxides, prevent the formation of oxides, promote flow of the molten brazing material or promote bonding. The optimum amount of flux depends on the particle size of the powder components, their composition and the composition of the substrate. Generally, as particle surface to volume ratio increases, the amount of flux must be increased.

When the single step application mixture includes the ceramic powder, metal brazing material, flux, binder and vehicle, the ceramic powder is present in an mount in the range of about 2 to about 60 wt. %, the brazing material is present in an mount in the range of about 5 to about 70 wt. %, the flux is present in an amount in the range of about 5 to about 30 wt. %, the optional binder is present in an amount in the range of about 2 to about 10 wt. % and the vehicle is present in an amount in the range of about 20 to about 65, preferably about 40 to about 50, wt. %, with the wt. %s being based on the weight of the ceramic powder, brazing material, flux, binder and vehicle.

A multiple step application mixture suitable for use in the first step (box 18) that does not contain a ceramic powder, metal brazing powder or metal powder can include the binder in an amount in the range of about 2 to about 20 wt. %, flux in an mount in the range of about 5 to about 40 wt. % and vehicle in an amount in the range of about 50 to about 95 wt. %, with the wt. %s being based on the weight of the binder, flux and vehicle. The powders are then provided in the second step (box 20) to achieve the desired loading, discussed below.

The mixture is applied to the substrate surface to obtain surface loadings, after vehicle removal, effective to permit the surface modification. The ceramic powder is preferably present on the substrate surface to obtain a loading of about 10 to about 250 grams per square meter (gm/m$^2$). The loading for the brazing material in general and the metal brazing powder in particular is preferably about 5 to about 400 gm/m$^2$. The loading of the flux is about 20 to about 250 gm/m$^2$. The loading of the binder is preferably 5 to about 50 gm/m$^2$.

The optional aqueous flux mixture that is used to provide additional flux has about 70 to 80 wt. % water and about 20 to 30 wt. % flux, based on the total weight of the water and flux.

The substrate can be made-of aluminum, aluminum alloy, steel, aluminum or aluminum alloy coated steel, ceramic and the like. Preferably, the substrate surface (though not necessarily the body of the substrate) is aluminum rich. The substrate can withstand the elevated temperature to which it is exposed. The material from which the substrate is made can be one that often cannot be brazed due to the low melting temperature of the material, e.g., die cast aluminum. The substrate can experience deformation, degradation, or other undesirable changes upon exposure to high temperatures, e.g., a temperature above 650° C.

The mixture can be applied to the substrate surface in a conventional method such as brushing, immersion or spraying. The brazing material can be on the surface prior to application of the mixture. Conventional spraying techniques may be used in the multi-step application method of the invention.

The topological modifications can be selectively made to some areas of the substrate surface and not to other areas so as to obtain an unmodified area at least partially surrounded by a modified area. Selective masking of the substrate surface can be used to inhibit application of the ceramic powder to the masked areas to create the unmodified area.

The temperature to which the surface having the mixture thereon is subjected is preferably a brazing temperature, i.e., a temperature at which at least partial melting occurs. The temperature can be in a range of about 500° to about 610° C., i.e., about 930° to about 1,130° F. for aluminum rich materials and will depend in large part on the melting temperature of the materials being used in any given modification procedure. The melting temperature depression due to encapsulation should be taken into consideration when selecting a brazing temperature. Preferably, the surface is exposed to the elevated temperature in an inert atmosphere having a low dew point, e.g., −40° F. A nitrogen atmosphere is well suited for the process.

The modified surface can exhibit one or more of several desirable physical or chemical properties or an improvement therein. The physical properties include hydrophilicity, hydrophobicity, wear resistance, corrosion resistance, oxidation resistance, paint/glue adhesion, thermal insulation, heat transfer capability and an increase in surface area.

A hydrophilic surface can be obtained by increasing the amount of ceramic powder which increases the number of microscopic features. An alternative is to utilize ceramic zeeospheres to create the features. It is presently theorized that if the modification is not performed over the entire substrate surface but rather over only a percentage thereof, with the unmodified surface area being distributed throughout the modified surface area, better results are obtained as compared to when the entire surface is modified. It is presently theorized that the unmodified surface acts as a channel to permit the water to more rapidly flow off the surface. A presently preferred percent surface modification is up to about 80% with the remaining percent being unmodified surface.

The hydrophilic surface is desirable in heat transfer devices, for example, in air conditioner and refrigerator evaporators because condensate can easily wet the modified surface and can then run off. Wetting is facilitated due to reduced surface tension on the modified surface. Wetting is not facilitated when the features and gaps are on a macroscopic scale. The efficiency of the evaporator is improved by the use of the modified substrate surface because the improved wetting facilitates removal of the liquid condensate, e.g., water, from a gas phase and the improved run off lessens or eliminates the formation of a layer of water on the modified surface. This reduces the inhibiting effect on heat transfer caused by the water layer which in turn improves the ability of the evaporator to transfer heat from the gas phase to the refrigerant within the evaporator.

To create a hydrophobic modified surface, the amount of flux used is greater than the minimum required to be effective. This amount of flux results in an increase in the flow of the flux, ceramic powder and metal brazing powder which results in a smoother surface that lacks or has a reduced amount of the microscopic features. Alternatively, a hydrophobic modified surface can be obtained by reducing the amount of ceramic powder or increasing the temperature or time period to completely melt the metal brazing powder.

The hydrophobic surface is desirable in applications where it is desirable to repel water from the surface and inhibit penetration of the water. For example, modifying the surface of a part by making it hydrophobic can inhibit corrosion.

A monolithic layer of ceramic powder can be formed on the substrate surface by selection of the loading of the ceramic powder to achieve the same.

The ceramic powder layer imparts wear resistance to the substrate surface and can protect the substrate from abrasive forces. This is especially useful when the substrate surface is relatively soft yet the environment to which it is exposed contains abrasive forces. For example, a radiator in an off-road motor vehicle can be exposed to dust, grit and particulate matter that can harm it. The use of a ceramic powder on the radiator can provide it with the wear resistance necessary to withstand off-road conditions.

The ceramic powder layer imparts corrosion resistance to the substrate surface to at least inhibit corrosives from penetrating to the substrate surface. For example, the interior of a reaction vessel for corrosives can have a ceramic powder layer to protect the substrate surface.

The ceramic powder layer can also contribute to the oxidation resistance of the substrate surface by inhibiting the penetration of oxygen to the substrate surface. For example, a substrate surface that is prone to oxidation can be protected by the ceramic powder.

Paint/glue adhesion is improved by an irregular surface obtained by selecting the ceramic powder, elevated temperature or time period at the elevated temperature so that the modified surface has numerous microscopic features (as previously defined) to which the paint or glue may bond.

EXAMPLE

Substrates having modified surfaces were produced using the mixtures of TABLE I, below, and various substrate surfaces. For each specimen group, the mixture was applied to different substrates.

The heat transfer capability is decreased or increased by decreasing or increasing, respectively, the number of microscopic features. An increase in the number of features increases the turbulence of fluid at the surface and thereby increases the heat transfer capability at the surface. An increase or decrease in heat transfer capability of a surface of a structure can help reduce or maintain, respectively, the temperature of the surface and hence of the structure.

The thermal insulation is decreased or increased by the selection of the ceramic powder. If a solid ceramic powder is used the thermal insulation decreases. If a hollow ceramic powder such as zeeospheres is used the thermal insulation increases. An increase or decrease in the thermal insulation of a surface of a structure can help maintain or reduce, respectively, the temperature of the surface and hence of the structure.

The surface area is increased by the increasing the number of microscopic features and causing an irregular surface to be formed on the substrate surface. Increasing or decreasing the surface area increases or decreases, respectfully, the heat loss from the surface. For example, an increase in the surface area increases the heat loss because more area is available from which the heat can be removed.

The location of the surface modification can vary depending upon the desired result. The surface modification can occur in an area that lacks a joint where two surfaces are united. Alternatively, the surface modification can occur at an area that has a joint.

The following example is given by way of illustration and not limitation.

TABLE I

Compositions of Mixtures and Test Results

| Specimen Group | Ceramic Powder (wt %) | Powder Metal (wt %) | Flux (wt %) | Vehicle (wt %) | Substrate Surface(s) | Adhesion, Processing Remarks |
|---|---|---|---|---|---|---|
| I | Silica Alumina[1] (3) | AA 718[2] (28) | Nocolok 100[3] (17) | Water (52) | AA 3003, 304, 409, Aluminized Steel | Good adhesion, dry before braze |
| II | Silica Alumina[1] (5) | AA 718[2] (40) | Nocolok 100[3] (25) | Dipropylene Glycol (29.9) Hydroxy Propylcellulose (0.1) | AA 3003, 304, 409, Aluminized Steel | Good adhesion, radius bend very good- Do not dry before braze |
| III | Silica Alumina[1] (3) | AA 719[5] (28) | Nocolok 100[3] (17) | Water (52) | AA 3003, 304 | Good adhesion- Dry before braze |
| IV | Silicon[5] Carbide (35) | AA 718 (6) | Nocolok 100[3] (15) | Water (44) | AA 3003, 304, 409, Aluminized Steel | Good adhesion, radius bend very good- Dry before braze |
| V | Silicon Nitride[6] (9) | AA 718 (26) | Nocolok 100[3] (16) | Water (49) | AA 3003, 304, 409, Aluminized Steel | Good adhesion- dry before braze |
| VI | Silicon Carbide (46) | AA 718 (11) | Nocolok 100[3] (8) | Dipropylene Glycol (34.9) Hydroxy Propylcellulose (0.1) | AA 3003, 304, 409, Aluminized Steel | Good adhesion, radius bend very good- Do not dry before braze |

[1]The silica alumina ceramic powder is zeeospheres 600 or 800.
[2]AA 718 brazing alloy has a composition of 88 wt % aluminum and 12 wt % silicon
[3]Nocolok 100 is a potassium fluoro aluminate complex that is commercially available from Solvay Performance Chemicals.
[4]AA 719 brazing alloy has a composition of 76 wt % aluminum, 10 wt % silicon, 10 wt % zinc and 4 wt % copper.
[5]The silicon carbide is commercially available from Buehler Ltd.
[6]The silicon nitride is commercially available from Aldrich Chemical Co.

The substrate surfaces having the mixture thereon were exposed to an elevated temperature of about 600° C. for a time period of about 2 minutes or less.

To determine if the adhesion was good, the specimens were examined for cracks, bubbles and other signs of nonadhesion. In a radius bend test, each specimen was bent back upon itself. If the specimen could be bent back upon itself without the modification cracking, it received a very good rating.

The specimens were subjected to repeated exposure to water, followed by drying, to determine whether they were hydrophilic. All of the specimens were very hydrophilic.

After a time period, the specimens disclosed below in TABLE II were tested by placing about 0.125 inches of each specimen in deionized water and measuring the time needed for the water to rise, on the modified surface, one-half inch, one inch and one and one-half inches, with the maximum time permitted being 90 seconds. In a different experiment, one drop of water was placed on the dried modified surface of the specimen and the time period necessary to for the water to attain a diameter of one and one-half inches was determined.

TABLE II

Hydrophilicity Test Results

| Sample (Specimen Group)[1] | Ceramic Powder | Substrate Surface | Rise, in seconds, to 1/2" | Rise, in seconds, to 1' | Rise, in seconds, to 1 1/2" | Rise in 90 seconds | Time for 1 drop of water to spread to 1-1/2 inches (sec) |
|---|---|---|---|---|---|---|---|
| I (V) | Silicon Nitride | 304 ss | 6 | 17 | 90 | 1-1/2" | 19 |
| II (I) | Silica Alumina[2] | Aluminized Steel | 4 | 19 | 60 | 1-3/4" | 34 |
| III (II) | Silica Alumina[3] | 3003 Aluminum | 2 | 30 | — | 1-3/8" | 18 |
| IV (III) | Silica Alumina[2] | Aluminized Steel | 15 | — | — | 3/4" | 60[4] |
| V (I) | Silica Alumina[3] | Aluminized Steel | 3 | 18 | 82 | 1-1/2" | 32 |

[1]Refers to the specimen group of Table I
[2]Zeeosphere type 600 commercially available from Zeelane Industries, St. Paul, Minnesota.
[2]Zeeosphere type 800 commercially available from Zeeland Industries, St. Paul, Minnesota.
[3]After 60 seconds the spread was at 1-1/4" and the experiment was stopped.

The flux used in each specimen of TABLE 2 was Alday 2805 which is a potassium fluoro aluminate flux. The metal brazing powder used for SAMPLES I, II, III and V was AA 718 which has a composition of 88 wt. % aluminum and 12 wt. % silicon. The metal brazing powder of SAMPLE IV was AA 719 which has a composition of 76 wt. % aluminum, 10 wt. % silicon, 10 wt. % zinc and 4 wt. % copper. The vehicle for SAMPLES I, II, IV and V was water. The vehicle for SAMPLE III was glycol.

Only one side of each specimen was modified. The other, unmodified side exhibited no rise of water and a drop placed thereon beaded and did not spread. Thus, the unmodified surface exhibited no hydrophilicity.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A method of modifying the surface of a substrate, the method comprising the steps of:
    applying to a substrate surface to be modified a mixture comprising a ceramic powder, a brazing material and a flux;
    heating the applied mixture to an elevated temperature effective to activate the flux and at least partially melt the brazing material.

2. The method of claim 1 wherein the substrate surface is a metal substrate surface.

3. The method of claim 1 wherein the brazing material includes a zinc-containing metal powder selected from the group consisting of a zinc and aluminum powder and an aluminum, silicon and zinc powder.

4. The method of claim 1 further comprising the step of solidifying the melted brazing material to bond the ceramic to the surface.

5. The method of claim 1 further comprising the step of applying a binder to the substrate to hold the ceramic powder and flux thereto prior to the heating step.

6. The method of claim 1 wherein the mixture further comprises a binder selected from the group consisting of methyl methacrylates, isobutylenes and polystyrene intermediates.

7. The method of claim 5 wherein the binder is applied before the mixture containing the ceramic powder and flux and the step of applying comprises a first applying step of applying the binder to the substrate and a second applying step of spraying the mixture containing the ceramic powder and flux at the applied binder to encapsulate at least a portion of the ceramic powder and flux in the binder.

8. The method of claim 1 wherein the ceramic powder contains silica.

9. The method of claim 1 wherein further comprising the step of selectively masking the substrate surface to create a masked area that inhibits applying of the ceramic powder to the masked area.

10. The method of claim 1 wherein the mixture further comprises a binder and the applying step is a single step of applying the mixture.

11. The method of claim 1 wherein the modified surface is a hydrophilic surface.

12. The method of claim 1 wherein the modified surface is a corrosion resistant surface.

13. The method of claim 1 wherein the brazing material is a metal brazing powder.

14. A method of modifying the surface of a substrate, the method comprising the step of:
    applying to the substrate surface components including a binder, a flux a ceramic powder, and a material selected from the group consisting of metal powder and brazing material.

15. The method of claim 14 further comprising the steps of:
    heating the applied mixture and the substrate surface to which it is applied to an elevated temperature effective to activate the flux and at least partially melt the brazing material; and
    solidifying the molten brazing material.

16. The method of claim 15 wherein the elevated temperature is in the range of about 530° to about 610° C.

17. The method of claim 14 wherein the components are applied to an area of the substrate surface that is free of a joint with another substrate surface.

18. The method of claim 14 wherein the components are mixed together prior to being applied to the substrate surface and the applying step is a single step of applying the mixture.

19. The method of claim 14 wherein the brazing material is a metal brazing powder.

20. A method of modifying the surface of a substrate, the method comprising the steps of:

applying to the substrate surface a ceramic powder and a material selected from the group consisting of a metal powder and a metal brazing material;

applying a flux to the applied selected material and applied ceramic powder;

heating the applied flux to an elevated temperature effective to activate the flux.

21. The method of claim 20 wherein the flux is inorganic.

22. The method of claim 20 wherein the flux includes a potassium fluoro aluminate.

23. The method of claim 20 wherein the ceramic powder contains a silica.

24. The method of claim 20 wherein the substrate surface is a metal substrate surface.

25. The method of claim 20 wherein the ceramic powder and the material selected from the group consisting of a metal powder and metal brazing material are mixed together with a binder before being applied to the substrate surface and wherein the mixture of the ceramic powder, selected material and binder is applied to the substrate surface.

26. The method of claim 25 further comprising mixing a vehicle with the binder and the ceramic powder and the material selected from the group consisting of a metal powder and metal brazing material.

27. The method of claim 20 wherein the metal brazing material includes a zinc-containing metal powder selected from the group consisting of a zinc and aluminum powder and an aluminum, silicon and zinc powder.

28. The method of claim 20 wherein the materials applied to the substrate surface include a metal brazing material and wherein the heating step includes heating the metal brazing material to a temperature effective to at least partially melt the metal brazing material, the process further comprising the step of solidifying the melted brazing material to bond the ceramic to the surface.

29. The method of claim 20 further comprising the step of applying a binder selected from the group consisting of methyl methacrylates, isobutylenes and polystyrene intermediates to the substrate surface prior to the step of applying to the substrate surface the ceramic powder and the material selected from the group consisting of a metal powder and metal brazing material.

30. The method of claim 25 wherein the binder is selected from the group consisting of methyl methacrylates, isobutylenes and polystyrene intermediates.

31. The method of claim 20 further comprising the step of selectively masking the substrate surface to create a masked area that inhibits applying of the ceramic powder.

32. The method of claim 20 wherein the step of applying to the substrate surface a material selected from the group consisting of a metal powder and a metal brazing powder includes the step of mixing the material selected with a binder and applying the mixture to the substrate surface before applying the ceramic powder.

33. The method of claim 20 further comprising the step of applying a binder to the substrate surface and wherein the step of applying to the substrate surface a ceramic powder and a material selected from the group consisting of a metal powder and a metal brazing powder includes the step of mixing the material selected and the ceramic powder together and applying the mixture to the substrate surface after applying the binder to the substrate surface.

34. A method of modifying the surface of a substrate, the method comprising the steps of:

applying to the substrate surface components including a ceramic powder, a flux and a material selected from the group consisting of a metal powder and metal brazing material, at least one component being applied prior to another component;

heating the applied flux and applied selected material to an elevated temperature effective to activate the applied flux and to at least partially melt at least part of the applied selected material.

35. The method of claim 34 further comprising the step of mixing the material selected from the group consisting of a metal powder and metal brazing material with the flux prior to applying these components to the substrate surface and wherein the mixture and the ceramic powder are applied to the substrate surface.

36. The method of claim 34 further comprising the step of mixing the ceramic powder with the material selected from the group consisting of a metal powder and a metal brazing material prior to applying these components to the substrate surface and wherein the mixture and the flux are applied to the substrate surface.

37. The method of claim 34 further comprising the step of mixing the ceramic powder with the flux prior to applying these components to the substrate surface and wherein the mixture and the material selected from the group consisting of a metal powder and metal brazing material are applied to the substrate surface.

38. The method of claim 34 wherein the flux includes a potassium fluoro aluminate, the ceramic powder contains a silica, and the brazing material includes a zinc-containing metal powder selected from the group consisting of a zinc and aluminum powder and an aluminum, silicon and zinc powder.

39. The method of claim 34 further comprising the step of applying a binder to the substrate surface, the binder being selected from the group consisting of methyl methacrylates, isobutylenes and polystyrene intermediates.

* * * * *